June 11, 1935.  F. E. MUNSCHAUER  2,004,794
CLUTCH
Filed Nov. 15, 1934   3 Sheets-Sheet 1
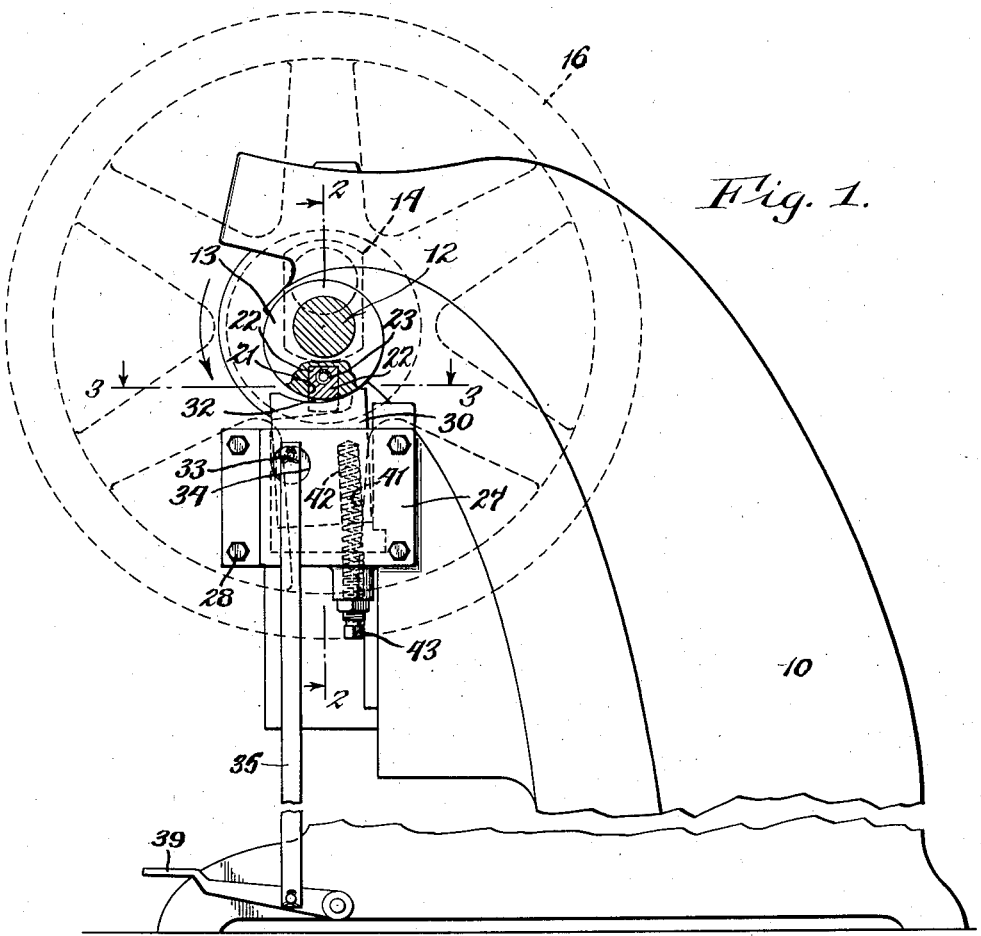
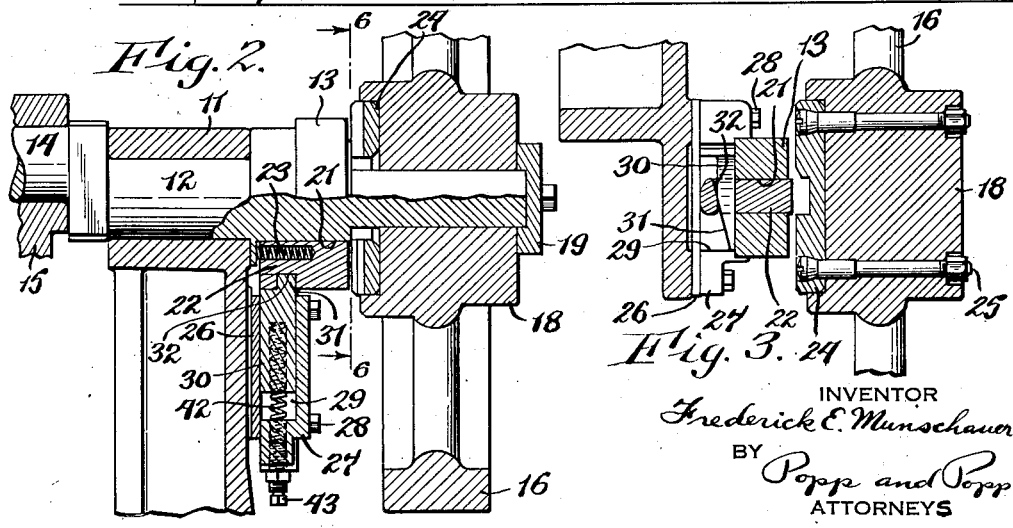
INVENTOR
Frederick E. Munschauer
BY Popp and Popp
ATTORNEYS June 11, 1935. F. E. MUNSCHAUER 2,004,794
CLUTCH
Filed Nov. 15, 1934 3 Sheets-Sheet 2

INVENTOR
Frederick E. Munschauer
BY Popp and Popp
ATTORNEYS

June 11, 1935.  F. E. MUNSCHAUER  2,004,794
CLUTCH
Filed Nov. 15, 1934   3 Sheets-Sheet 3

INVENTOR
Frederick E. Munschauer
BY
Pogue and Pogue
ATTORNEYS

Patented June 11, 1935

2,004,794

UNITED STATES PATENT OFFICE 2,004,794

CLUTCH

Frederick E. Munschauer, Buffalo, N. Y., assignor to Niagara Machine & Tool Works, Buffalo, N. Y., a corporation of New York Application November 15, 1934, Serial No. 753,175

7 Claims. (Cl. 192—25)

This invention relates to a clutch and more particularly to a pin clutch of the type illustrated in Patent No. 1,752,843, Paul R. Hahnemann, dated April 1, 1930.

Clutches of the general type to which this invention relates are designed for heavy duty service in starting and stopping machinery, such as punch presses and the like and in general include a pulley wheel loosely mounted on the drive shaft and face jaws which are engaged by an axially slidable pin mounted in a hub formed in the driven shaft so as to provide a driving connection between the pulley and the shaft. This pin is normally held in engagement with the jaws on the pulley by a spring and is moved out of engagement by a cam block which is shiftable into the path of the pin and has its cam surface arranged to engage and retract the pin.

It is desirable in such clutches to have a large hub formed in the driven shaft for carrying the coupling pin. Within limits, the larger this hub is made the more securely the pin is carried and the pin is also carried at a greater distance from the center of the shaft thereby resulting in a reduced strain on the pin. Heretofore these integral hubs have been made concentric with the shaft and increasing the size of the hub necessarily added weight and increased the inertia of the driven shaft and at the same time made forging difficult inasmuch as it necessitated forging a very large hub on a very small shaft.

Moreover, in the type of clutch shown in the present application and in the said Hahnemann patent the operating cam block is mounted for swinging movement crosswise of the shaft for a purpose which will hereinafter appear and in order to provide clearance between the block and the hub it was necessary to curve the engaging end of the block at a considerably greater radius than the hub. By doing this when the pin struck the cam surface of the throw-out block it could not engage the full extent of the cam surface but necessarily struck a small area with a glancing blow, this resulting in excessive localized wear on the cam block.

With a concentric hub in this type of pin clutch the hub did not have any effect in counterbalancing the main crank or eccentric, this being provided by the present invention.

The present invention proposes to form the hub carrying the clutch pin so that it is eccentric to the shaft. This permits of moving the pin a greater distance from the center of the shaft and providing more supporting metal around the pin without increasing the mass of the hub and adding to the inertia of the main shaft and to the difficulty in forging the hub on the shaft. At the same time the engaging end of the movable throw-out block can be curved concentric with the path of the pin, thereby insuring that the pin strikes a substantial area of the cam surface during initial engagement of the pin and block, thereby to avoid localized wear. The present invention also proposes to so arrange the eccentric hub that it counterbalances the main eccentric or cam and provides smoother operation.

A further feature of the present invention is a novel means for bolting a hardened plate to the hub of the pulley, this plate being formed with jaws which the coupling pin engages. Heretofore these jaws were formed directly in the hub and hardened wear pins inserted at the striking surface and in substituting a removable hardened jaw plate it was found difficult to get a tight fastening that remained tight under the reversing loads present, especially since the plate was hardened and the pulley hub relatively soft. Further, such a plate is necessarily a wear part requiring field replacement and it is therefore desirable to provide such a plate which does not require special positioning to fit it properly and which is properly tightened in position with only the use of a wrench. To this end, in accordance with the present invention, tapered bolt holes are provided in the hardened face plate and certain of these holes are located out of register with the corresponding holes through the pulley hub so that when taper-headed bolts are inserted and tightened, the plate is drawn against the pulley hub and is also bound against axial rotation relative to the hub by the inclined surfaces of the bolt heads. This binding action also binds the bolts in their holes.

In the accompanying drawings:

Fig. 1 is a fragmentary vertical section through the driven shaft of a machine showing a clutch embodying my invention.

Fig. 2 is a sectional view of the clutch and associated parts taken on line 2—2, Fig. 1 and showing the clutch in its inoperative position.

Fig. 3 is a horizontal section, taken on line 3—3, Fig. 1 and showing the clutch in its inoperative position.

Figure 4:
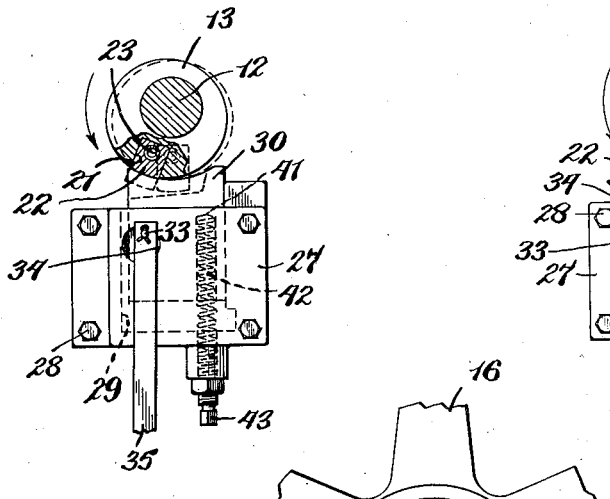
Fig. 4 is a fragmentary vertical section similar to Fig. 1, showing a portion of the clutch broken away and showing the clutch being opened by projecting the cam block into the path of the clutch pin.

In its general organization the present clutch includes a spring loaded pin which is carried by the salient portion of an eccentric hub which is integral with the main shaft of the machine and is movable into and out of coupling relation with a jaw plate bolted to the face of the pulley hub, a cam plate loosely guided for movement toward and from the pin and adapted to engage the same and effect its retraction from the driving member or pulley, and spring means reacting on the cam plate and so arranged that during the withdrawal of the pin from coupling relation the plate is moved to compress the spring and upon completion of this withdrawing movement the spring reacts to swing the cam plate and effect a further retraction of the pin from the driving pulley thereby insuring a clearance between the pin and the pulley and preventing the usual clicking noise and wear due to inoperative contact between these parts. Novel means are provided for binding the jaw plate to the pulley hub.

The machine in connection with which the present clutch is intended to be used includes a frame 10 which is formed to provide a bearing 11 in which the main or driven shaft 12 is journalled, as best shown in Fig. 2. On the outside of the bearing 11 the driven shaft 12 is formed to provide an integral hub or collar 13. This hub or collar 13 is formed eccentric to the driven shaft and carries the clutch pin in its salient part as hereinafter described. In the machine shown the driven shaft 12 is formed to provide a crank 14 which reciprocates a member 15 for operation on the work in connection with which the machine is intended to be used. The crank 14 and the eccentric hub or collar 13 are preferably arranged to counterbalance one another. On the outer end of the shaft 12 the driving pulley 16 is loosely mounted and continuously turned by a belt or in any other suitable manner. This pulley has the usual hub 18 and is held on the shaft 12 by a cap 19 or in any other suitable manner.

Figure 6:
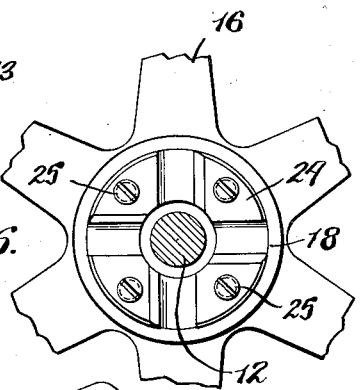
Fig. 6 is a fragmentary view of the pulley which forms the driving member of the clutch.
Figure 7:
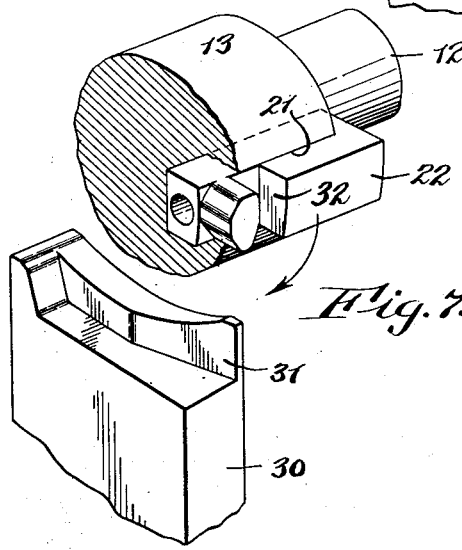
Fig. 7 is a fragmentary perspective view of the eccentric hub on the driven shaft, the pin carried thereby and the cam throw-out block which engages and retracts this pin.

As best shown in Fig. 7 the eccentric hub or collar 13 has its salient portion grooved to provide a slideway 21 which is parallel with the axis of the shaft and this slideway receives a coupling pin 22. A pocket is drilled in the inner end of this pin and in this pocket is arranged a small helical compression spring 23 which bears against the inner end of the slideway 21 and urges the pin 22 outwardly and into engagement with the hub 18 of the driving pulley. To the hub 18 of the pulley, as best shown in Fig. 6, is bolted a hardened plate 24 by bolts 25, as hereinafter described, this plate having face jaws so that, when released, the pin is urged into engagement with one of these jaws by its spring 23 and thereby establishes a driving connection between the driving pulley and the shaft 12 until the pin 22 is withdrawn.

Adjacent the shaft 12 a casing is mounted on the machine frame which includes a flat rear plate 26 and a cover 27, the casing being secured by bolts 28 which extend to the machine frame. As best shown in Figs. 2 and 4, the cover section 27 is formed to provide a rectangular pocket 29 which is open at the end adjacent the shaft 12. In this pocket is loosely arranged an oblong cam plate 30 which is preferably recessed or curved at its outer end to conform to the path of the pin 22 and at this end the cam plate 30 is formed to provide a throw-out cam 31. In register with the leading edge of this throw-out cam 31 the coupling pin 22 is provided with a recess 32 and it therefore follows that when the cam plate 30 is moved toward the driven shaft, the leading end of its cam 31 enters the groove 32 of the coupling pin 22, the pin riding up on the cam 31, and being moved inwardly against the resistance of its spring 23 and out of engagement with the radial grooves or slots in the hub of the driving pulley. The movement of the shaft 12 is therefore stopped until the cam plate 30 is withdrawn to permit the coupling pin 22 to spring back into engagement with the driving pulley hub and establish a driving connection.

On one side of the cam plate 30 a pin 33 is mounted, which pin projects laterally outward from the cam plate and through an opening 34 in the casing cover 27. This opening 34, as best shown in Fig. 4, limits both the upward and downward movement of the cam plate 30 by forming a stop for its pin 33. To the outer end of this pin is pivotally secured a bar or link 35, the other end of which is pivotally secured to a foot treadle 39 between its tread and its pivotal connection with the machine frame and this treadle is normally held in its elevated position by a spring 42 as hereinafter described.

Figure 5:
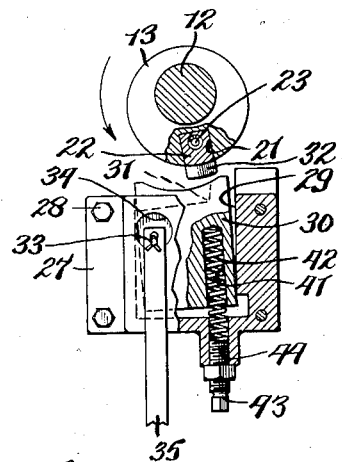
Fig. 5 is a view similar to Fig. 4 showing the throw-out cam block released from the clutch pin.

It is apparent that when the operator steps on the treadle 39 the bar and the cam plate 30 will be drawn downwardly thereby disengaging its cam from the pin 22 and permitting this coupling pin to be urged into coupling engagement with the jaws of the face plate on the driving pulley by its spring 23. This position of the parts is indicated in Fig. 5. Upon releasing the treadle a reverse motion of the parts is caused by the spring 42 and the cam plate is moved into the path of the coupling pin 22 and this pin rides up on the cam 31 and is withdrawn from engagement with the jaws of the face plate on the pulley.

In the absence of provision to prevent it the movement of the shaft 12 and the retracting movement of the coupling pin 22 stops the instant that the driving connection between the coupling pin and the jaws of the face plate on the driving pulley is broken. This, while sufficient to break the driving connection, is not sufficient to break all contact between the coupling pin and the jaws and consequently the coupling pin still contacts with the tips of these jaws and produces an undesirable clicking noise as the pin traverses the jaws. To eliminate this clicking noise and also to avoid the resultant wear on both the coupling pin and the jaws on the face plate of the pulley hub while the clutch is in neutral, the clutch shown in the drawings provides for a secondary retraction of the pin after the driving connection has been broken, this secondary retraction moving the coupling pin 22 completely out of the influence of the driving pulley jaws and eliminating noise and wear on the parts when the clutch is in neutral. For this purpose the pocket 29 in the outer casing section 27 which receives the cam or throw-out plate 30 is wider than the plate 30 so that the cam plate has a limited lateral play therein and is free to swing about its pivotal connection with the bar or link 35 as an axis. On the side opposite to this pivotal connection a recess 41 is drilled into the cam plate and this recess receives a helical compression spring 42. The rear end of this spring 42 bears against an adjustment screw 43 which is arranged at the corresponding side of the casing section 27. This adjusting screw 43 is screwed into the outer end of a hole 44 registering with the recess 41 of the cam plate 30 so that upon removing the adjusting screw the spring 42 can be removed through the open end of the hole 44 and a new spring substituted should this become necessary. The adjusting screw is held in its adjusted position by means of a lock nut, as best shown in Figs. 4 and 5, or in any other suitable manner.

It is apparent that the tendency of this spring is to throw the upper end of the cam plate forwardly, or toward the operator, about the pivotal connection between the cam plate and the link 35.

Assuming the clutch to be in operation with the foot treadle depressed as shown in Fig. 5, upon releasing the treadle the cam plate 30 is moved upwardly by the spring 42 and the leading part of the cam 31 on the cam plate is thereby arranged in line with the groove 32 in the coupling pin 22 and as soon as the pin strikes the cam surface 31 it is retracted from engagement with the jaws on the face plate 24 of the driving pulley. As soon as the coupling pin 22 strikes the cam surface 31 the friction between these members causes the cam plate 30 to be driven rearwardly against the rear side of the pocket 29 and against the resistance of its spring 42. This position of the parts is illustrated by full lines in Fig. 4. As soon as the coupling pin is withdrawn far enough to be released from driving engagement with the jaws on the driving pulley, the rotating movement of the shaft and the coupling pin 22 stops and at the same time the driving contact between the coupling pin and the cam ceases. The cam plate return spring 42 thereupon comes into action and forces the cam plate 30 to rotate about its pivotal connection with the bar 35. This secondary movement of the cam plate causes its cam 31 to ride along the groove 32 in the coupling pin 22 and retract the coupling pin still further from the jaws of the driving pulley. It is therefore apparent that by the provision of this means for providing a secondary retraction of the coupling pin through a reacting motion of the cam plate, the coupling pin is withdrawn sufficiently far to provide a definite clearance between it and the face jaws on the hub of the driving pulley and that therefore, when the clutch is in neutral, as shown in Fig. 1, there can be no ineffectual contact between the coupling pin and the face jaws of the driving pulley, such contact providing a disagreeable noise as well as wear between these parts.

An important feature of the present invention is the form of the integral hub or collar 13 which carries the coupling pin 22 in its salient portion. It is desirable to have this hub or collar relatively large so that the coupling pin 22 is supported a relatively great distance from the center of the shaft, this resulting in less strain upon the coupling pin since a more favorable driving leverage is obtained. It is moreover desirable to have the hub 13 of large size since the coupling pin is supported by a greater mass of metal and consequently more reliably held. It has heretofore been the practice to make this collar or hub 13 concentric with the driven shaft and with such a collar an increase in its diameter not only greatly increased the mass of the shaft 12, and therefore its inertia in starting and stopping, but also made the shaft extremely difficult to forge inasmuch as the provision of an excessively big enlargement on a relatively small shaft was necessarily difficult. To increase the effective size of the hub or collar 13 and at the same time avoid the objections encountered in increasing the size of a concentric hub or collar, as shown in the Hahnemann patent previously referred to, the present invention proposes to arrange this collar or hub 13 so that it is eccentric to the shaft 12. By so forming the collar or hub 13 eccentric to the shaft 12 and by arranging the coupling pin 22 in its salient portion, the coupling pin 22 is brought out a greater distance from the center of the shaft and a more favorable driving leverage obtained with an increasing reduction in wear and, at the same time, the mass of the collar or hub 13 is not increased, so that the mass and inertia of the driven shaft is not increased and also no difficulty is encountered in forging the integral collar 13 and shaft 12.

Figure 8:
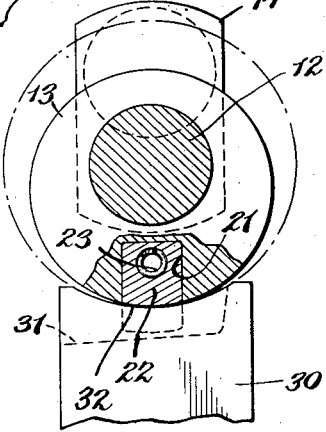
Fig. 8 is an enlarged view similar to Fig. 4 and showing the path of the clutch pin and the relation of the eccentric hub to the crank arms or eccentric of the machine.

As best shown in Fig. 8 the collar or hub 13 is also preferably offset to that side of the center of the shaft 12 opposite from the crank 14 so that the eccentric collar or hub 13 tends to counterbalance the crank 14 and obtain smoother running of the machine.

A further advantage is obtained by providing the eccentric hub 13. Upon reference to Figs. 4, 7 and 8 it will be seen that in swinging the block 30 the outer end of the block 30 must be curved so as to clear the hub or collar 13. With the hub 13 arranged concentric with the shaft 12, as in the Hahnemann patent, the curvature of the outer end of the cam plate or block 30 had to be considerably flatter than the path of movement of the pin 22 so that its extremities would clear the hub in all positions. This necessitated the pin 32 initially striking the extreme outer edge of the cam surface 31 instead of initially striking it squarely at the side of the cam plate. By mounting the pin 22 in the salient portion of an eccentric collar or hub 13, as in accordance with the present invention, it is apparent that the path of the pin, as illustrated by the dot-dash lines in Fig. 8, is considerably greater than the diameter of the eccentric hub. It is therefore possible to curve the outer end of the cam plate or block 30 to conform with the path of the pin 22 so that this pin strikes the cam plate the full extent of its cam surface instead of merely at one corner thereof, as has been necessary heretofore.

Figure 9:
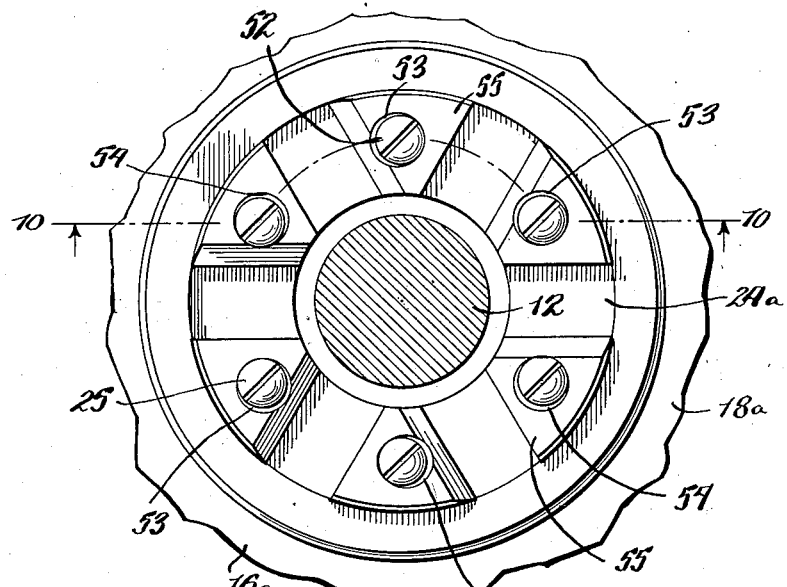
Fig. 9 is an enlarged view similar to Fig. 6 showing a pulley having a face plate with six jaws removably attached by six bolts to the hub of the pulley, four being shown in the form of the invention illustrated in Figs. 1–8.
Figure 10:
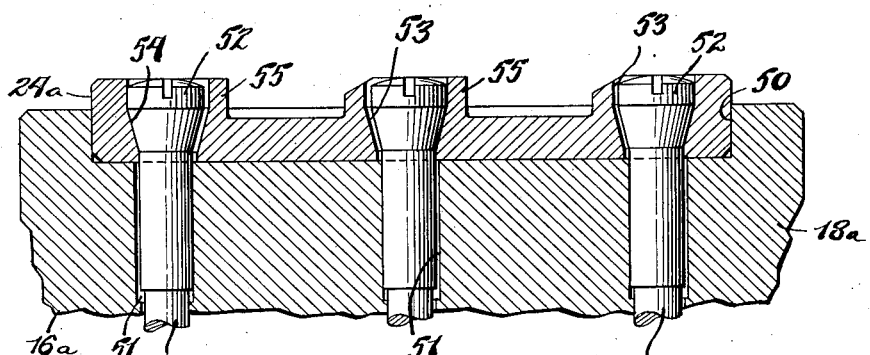
Fig. 10 is a section taken on line 10—10, Fig. 9 and illustrating the manner in which the taper-headed bolts hold the face plate on and also bind against the sides of their holes to prevent axial movement of the plate relative to the hub of the pulley.

In Figs. 9 and 10, the construction and method of bolting the hardened jaw face plate to the pulley hub is illustrated, this face plate being identical with the face plate 24 illustrated in Figs. 1–8 except that it is formed to provide six jaws instead of four and is secured by six bolts 25. As illustrated in Fig. 10, the hub of the pulley is provided with a recess 50 and from this recess bolt holes 51 extend through the hub of the pulley and receive the shanks of the bolts 25. These holes are slightly larger than the shanks of the bolts, as illustrated in Fig. 10. These bolt holes are evenly spaced in a circle about the axis of the pulley, this being an important feature of the present invention since this even spacing permits the face plate 24a to be placed in any position in bolting it in place. It is therefore impossible to apply the face plate in a wrong position.

The heads 52 of the bolts 25 are tapered at the shoulder between the head and the shank and these tapered heads are received in tapered holes 53 and 54 which are provided in the face plate, these holes each extending through one of the face jaws 55 provided in the face plate and which the coupling pin 22 engages to couple the clutch. These holes 53 and 54 are not, however, evenly spaced circumferentially and do not exactly register with the bolt holes 51 in the hub of the pulley. Treating the bolt holes 51 through the pulley hub as being on true centers, i. e. spaced exactly, the four tapered bolt holes 53 in the face plate are set back of center and the two opposite tapered bolt holes 54 are set ahead of center. This setting is, of course, very slight, the setting being preferably about .015 of an inch. Upon tightening the four bolts in the holes 53, it will be observed that their tapered heads bind against the forward side of their tapered holes and their shanks bind against the rear side of their holes 51 and that these bolts thereby take the direct load strains imposed on the face plate and pulley. The tapered heads of the other two bolts 52 bind against the rear side of the tapered holes 54 and their shanks bear against the forward side of their holes 51 and it is therefore apparent that these bolts take the backlash strains imposed upon the face plate and pulley. All of the bolts draw the face plate to the pulley and by binding in their holes insure against its loosening.

In practice it was found extremely difficult to get a tight fit between the face plate and the pulley inasmuch as they are subjected to reversing strains. This was found particularly so because the face plate was hard and being a wearing part necessarily required not infrequent replacement in the field. By tightening a series of taper headed bolts in offset tapered holes in the manner shown, the face plate is drawn securely against the pulley hub and the face plate is bound against axial rotation by the inclined surfaces of the bolt heads, this binding also binding the bolts in their holes in the pulley. It will further be seen that the face plate can be attached with only a wrench and that there is no chance for the repairman to make a mistake in applying the face plate in the field. Further, it is apparent that by so positioning the tapered holes that a majority of the bolts act as drivers and the rest act in a backlash direction, all driving strains are properly compensated.

From the foregoing it is apparent that by disposing the hub 13 eccentric to the machine shaft a number of important advantages are obtained and that a clutch of the type disclosed is provided which is stronger and less subject to wear than the clutch shown, for example, in the Hahnemann patent previously referred to and upon which the present invention is an improvement. It is further apparent that the present invention provides a secure and easy method of attaching a jaw plate to the hub of a pulley.

I claim as my invention:

1. A clutch of the character described, comprising concentric driving and driven members, an eccentric arm on said driven member, a coupling member at the outer end of said arm and movable into coupling relation with said driving member and retractable therefrom, a loosely guided cam plate arranged crosswise of the axis of said driven member and having a cam face along one side adapted to engage and retract said coupling member, a stop arranged at one side of said cam plate and limiting its movement toward said coupling member, a spring reacting against the opposite side of said cam plate, said spring urging said cam plate toward said coupling member and cooperating with said stop to continue the retraction of said coupling member after the driving connection between said driving and coupling members has been broken and thereby provide a clearance between said coupling member and said driving member and means for retracting said cam plate, the edge of said cam plate adjacent its cam surface having substantially the same curvature as the path of rotation of said coupling member.

2. A clutch of the character described, comprising concentric driving and driven members, an eccentric collar on said driven member, a coupling pin slidably carried in the salient part of said eccentric collar and slidable parallel with the axis of said members into engagement with jaws provided on said driving member, a loosely guided cam plate arranged crosswise of the axis of said driven member and movable toward and from said coupling pin, said cam plate having a cam face at its outer end adapted to engage and retract said pin and this outer end of the cam plate having substantially the same curvature as the path of rotation of said pin, a stop arranged at one side of the longitudinal center line of movement of said cam plate toward and from said pin and limiting the movement of that side of said cam plate toward said pin, and a spring reacting against the opposite side of said cam plate and urging said cam plate toward said pin, said cam plate being moved against the resistance of said spring during the uncoupling movement of said pin and said spring reacting and cooperating with said stop to move said cam plate to further retract said pin upon completion of its uncoupling movement and thereby provide a clearance between said coupling member and said driving member when said clutch is in neutral.

3. A clutch of the character described, comprising concentric driving and driven members, a face plate on one of said members and having a jaw, means carried by the other member for engaging said jaw to couple the clutch and means for securing the face plate to the corresponding member comprising tapered connecting members extending therethrough and arranged in tapered holes, the arrangement of said holes causing a lateral binding of said bolts in said holes.

4. A clutch of the character described, comprising concentric driving and driven members, a face plate on one of said members and having a jaw, means carried by the other member for engaging said jaw to couple the clutch and means for securing the face plate to the corresponding member, comprising tapered connecting members extending therethrough and arranged in a circular series of tapered holes, said series being coaxial with said members, the position of said members relative to said holes being such that at least one of said tapered members binds against the leading side of its tapered hole and another binds against the trailing side of its tapered hole.

5. A clutch of the character described, comprising concentric driving and driven members, a face plate on one of said members and having a jaw, means carried by the other member for engaging said jaw to couple the clutch and means for securing the face plate to the corresponding member, comprising bolts having tapered heads, said tapered heads being received in tapered holes in said face plate and the shanks of said bolts being received in holes in the corresponding member and the arrangement of the holes receiving the heads and the holes receiving the shanks of said bolts being such that the heads of said bolts bind against one side of the tapered holes.

6. A clutch of the character described, comprising concentric driving and driven members, a face plate on one of said members and having a jaw, means carried by the other member for engaging said jaw to couple the clutch and means for securing the face plate to the corresponding member, comprising bolts having tapered heads, said tapered heads being received in slightly oversize tapered holes in said face plate and the shanks of said bolts being received in slightly oversize holes in the corresponding member and the said tapered holes and the holes for said shanks through said corresponding member being slightly out of register to cause the heads and shanks of said bolts to bind in their respective holes.

7. A clutch of the character described, comprising a driven shaft, a drive pulley loose on said shaft, a face plate on the hub of said pulley around said shaft and having a jaw, means carried by said shaft for engaging said jaw to couple said clutch, said face plate being provided with an annular series of tapered holes and said hub being provided with a corresponding series of holes, some of which are slightly out of register, axially, with the holes in said face plate and slightly undersize bolts extending through said holes and having tapered heads seating in the tapered holes in said face plate whereby upon tightening said bolts the tapered heads bind against one side of the tapered holes and their shanks bind against the opposite side of the holes through said hub.

FREDERICK E. MUNSCHAUER.